Patented July 30, 1946

2,404,914

UNITED STATES PATENT OFFICE 2,404,914

MANUFACTURE OF CYCLIC HYDROCARBONS

William J. Mattox, Riverside, Ill., assignor to Universal Oil Products Company, Chicago, Ill., a corporation of Delaware No Drawing. Application October 29, 1943, Serial No. 508,235

9 Claims. (Cl. 260—668)

This invention relates to a process for the production of cyclic hydrocarbons and more particularly to the conversion of ketones to produce cyclic materials therefrom.

An object of the invention is to provide an improved method for the production of cyclic compounds from compounds having the general formula:

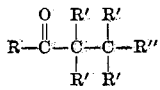

wherein R is an alkyl group containing at least two carbon atoms or an aryl group, while R' comprises an alkyl group or hydrogen and R'' an alkyl group.

A further object of the invention is the manufacture of naphthalene or alkyl naphthalenes by treating a phenyl-alkyl ketone, wherein the alkyl group contains at least three carbon atoms, three or more of said carbon atoms forming with the carbonyl group a straight chain arrangement of four or more carbon atoms, at elevated temperatures and in the presence of a suitable catalyst.

A still further object of my invention is to prepare a monocyclic aromatic hydrocarbon from a di-alkyl ketone containing at least six carbon atoms per molecule in straight chain arrangement.

Naphthalene is an important material utilized in the manufacture of dyes, picric acid, various phthalic acids, and the hydrogenated compounds tetralin and decalin corresponding to partial and complete hydrogenation. Naphthalene has the empirical formula $C_{10}H_8$, a melting point of 80° C., a boiling point of 218° C., and is commonly obtained in limited quantities from coal tar fractions. The present invention is directed to a new method of manufacturing naphthalene whereby to increase the available amount of this material.

In a broad aspect the present invention relates to a process for preparing cyclic hydrocarbons by reacting a compound selected from the group including dialkyl ketones containing at least six carbon atoms per molecule in straight chain arrangement and arylalkyl ketones wherein the alkyl group together with the carbonyl group forms a straight chain arrangement of four or more carbon atoms.

In one specific embodiment this invention relates to a process for preparing naphthalene which comprises subjecting phenyl-n-propyl ketone at elevated temperatures to contact with a catalyst comprising essentially an oxide of an element selected from the left-hand columns of groups IV, V and VI of the periodic table.

In another embodiment, the invention relates to a process for preparing toluene which comprises subjecting di-n-propyl ketone at elevated temperatures to contact with a catalyst comprising essentially an oxide of an element selected from the left-hand columns of groups IV, V and VI of the periodic table.

Ketones which may be converted into aromatic and alkylaromatic hydrocarbons include ethyl-n-propyl ketone, di-n-propyl ketone, butyl ketones and similar compounds having at least six carbon atoms in straight chain arrangement. Thus, ethyl-n-propyl ketone yields benzene as the predominant product of the process, while di-n-propyl ketone similarly gives a relatively high yield of toulene. Other ketones of higher molecular weight yield alkylated aromatic hydrocarbons. In addition to naphthalene which has been prepared by the treatment of phenyl-n-propyl ketone, various alkyl napthalenes may be formed by the conversion of such phenyl-alkyl ketones as phenyl isobutyl ketones, phenyl sec-butyl ketone, phenyl isoamyl ketone, etc. The arylalkyl ketones may be prepared by a number of known methods which include: condensation of an acylhalide with benzene or other aromatic hydrocarbon in the presence of a Friedel-Crafts type catalyst such as aluminum chloride, or sec-arylalkyl alcohols may be oxidized by passing the alcohol over a catalyst such as copper oxide or zinc oxide. In another method for manufacturing the phenyl alkyl ketones, an aliphatic acid and benzene are reacted in the presence of a Friedel-Crafts type catalyst. Aliphatic ketones employed in the process may be prepared by dehydrogenation of a sec-alcohol or hydrolyzing dihaloalkanes.

Catalysts which may be used in the present process include the oxides of the elements in the left-hand columns of groups IV, V and VI of the periodic table or any of these oxides or mixtures thereof supported on carriers such as the oxides of aluminum, magnesium, thorium, zinc, titanium, silicon, or similar materials.

Reaction temperatures between about 450° and about 700° C. are preferred while pressures may range from subatmospheric to approximately 500 pounds per square inch. In order to reduce the partial pressure of the reactants during the conversion, diluents such as benzene, low boiling hydrocarbons, or other relatively unreactive gases or vapors or hydrogen may be used. These diluent materials also assist in the reduction of the ketone and tend to decrease catalyst deposits which accumulate.

When employing the above catalyst and conditions of operation, phenyl-n-propyl ketone is converted to naphthalene by reduction of the ketonic group and cyclization as illustrated in the following structural equation:

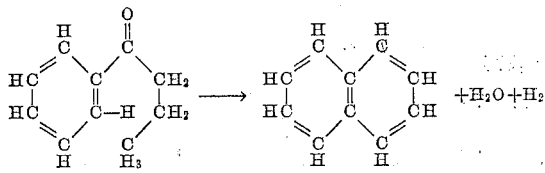

When treating an aliphatic ketone the reaction occurs in an analogous manner, the hydrogen and water apparently being removed from the dialkyl ketone and an aromatic hydrocarbon produced containing the same number of carbon atoms per molecule as present in the dialkyl ketone charged to the process.

The process of the present invention may be carried out in either batch or continuous types of operation. In a simple batch type process the ketone is brought to the conversion temperature and passed, together with the diluent, if used, over the catalyst. The products boiling below the range of the desired aromatic are removed and a crude fraction obtained which may be purified to give the pure aromatic. If desired, the reduced ketone after separation of water may be recycled, together with hydrogen, so as to increase the efficiency of the operation or the ultimate yield of aromatic. The hydrogen formed in the reaction may be sufficient for the reduction of the ketone or it may be advisable to add or recirculate additional hydrogen.

The following examples are introduced to illustrate results obtainable with the process of the present invention but are not to be considered as limiting the invention in accordance with the data submitted.

Example I

A mixture of phenyl-n-propyl ketone and seven mols of hydrogen was preheated and passed over a 10% $Cr_2O_3$—90% $Al_2O_3$ catalyst at 600° C. The hourly liquid space velocity of the ketone was 0.23 with the pressure at atmospheric. The following yields were obtained as weight per cent of the ketone charged:

Total liquid—52.6%; water—8%; gas—21.4%; and catalyst deposit—18%. After removing 35.6 weight per cent of a fraction boiling below the naphthalene range, a crude naphthalene fraction was obtained which amounted to 34 weight per cent of the charge. The crude fraction was treated to remove impurities and yielded naphthalene which had a melting point of 80° C.

Example II

A mixture of di-n-propyl ketone and hydrogen was treated under conditions similar to those employed in Example I. The reaction products were separated and the reduced ketone recycled to the process along with hydrogen formed. A satisfactory yield of toluene was recovered.

I claim as my invention:

1. A process for the production of a cyclic hydrocarbon which comprises reacting at elevated temperatures in the range of 450 to 700° C. a ketone having the general formula:

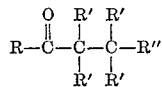

wherein R is selected from the group of hydrocarbon radicals consisting of an alkyl group containing at least two carbon atoms and the phenyl group, R' is selected from the group consisting of an alkyl group and hydrogen and R'' is an alkyl group, said reaction taking place in the presence of a catalyst comprising an oxide of an element selected from the left-hand columns of groups IV, V and VI of the periodic table supported on an oxide carrier.

2. A process for the manufacture of a monocyclic hydrocarbon which comprises reacting at elevated temperatures in the range of 450° C. to 700° C. a dialkyl ketone containing at least six carbon atoms per molecule in straight chain arrangement in the presence of a catalyst comprising an oxide of an element selected from the left-hand columns of groups IV, V and VI of the periodic table supported on an oxide carrier.

3. A process for the manufacture of a bicyclic aromatic hydrocarbon which comprises reacting at elevated temperatures in the range of 450° C. to 700° C. a phenylalkyl ketone containing at least three carbon atoms in the alkyl group, at least three of said carbon atoms forming with the carbonyl group a straight chain arrangement of four or more carbon atoms, in the presence of a catalyst comprising an oxide of an element selected from the left-hand columns of groups IV, V and VI of the periodic table supported on an oxide carrier.

4. A process for the manufacture of naphthalene which comprises subjecting a phenylalkyl ketone containing at least three carbon atoms in the alkyl group, said carbon atoms being in straight chain arrangement, to contact at elevated temperatures in the range of 450° C. to 700° C. with a catalyst comprising an oxide of an element selected from the left-hand columns of groups IV, V and VI of the periodic table supported on an oxide carrier.

5. A process for the manufacture of naphthalene which comprises contacting phenyl-n-propyl ketone at a temperature above about 450° C. but not in excess of about 700° C. with a catalyst comprising an oxide of an element selected from the left-hand columns of groups IV, V, and VI of the periodic table supported on an oxide carrier.

6. A process for the manufacture of an alkyl naphthalene which comprises reacting at a temperature above about 450° C. but not in excess of about 700° C. a phenylalkyl ketone containing more than three carbon atoms in the alkyl group, at least three of said carbon atoms forming with the carbonyl group a straight chain arrangement of four or more carbon atoms, in the presence of a catalyst comprising an oxide of an element selected from the left-hand columns of groups IV, V and VI of the periodic table supported on an oxide carrier.

7. A process for the manufacture of toluene which comprises reacting di-n-propyl ketone at elevated temperatures in the range of 450° C. to 700° C. in the presence of a catalyst comprising an oxide of an element selected from the left-hand columns of groups IV, V and VI of the periodic table supported on an oxide carrier.

8. A process for the dehydrocyclization of ketones which comprises reacting a phenylalkyl ketone, the alkyl group of which contains at least three carbon atoms in straight chain arrangement, at a temperature above 450° C. but not in excess of about 700° C. in the presence of a supported catalyst consisting of an oxide carrier and at least one other oxide of an element selected from the left-hand columns of groups IV, V and VI of the periodic table.

9. The process of claim 8 wherein said ketone comprises phenyl-n-propyl ketone.

WILLIAM J. MATTOX.